United States Patent
Wei et al.

(10) Patent No.: US 10,986,036 B1
(45) Date of Patent: Apr. 20, 2021

(54) METHOD AND APPARATUS FOR ORCHESTRATING RESOURCES IN MULTI-ACCESS EDGE COMPUTING (MEC) NETWORK

(71) Applicant: HON LIN TECHNOLOGY CO., LTD., Taipei (TW)

(72) Inventors: Hung-Yu Wei, Taipei (TW); Chun-Ting Chou, Taipei (TW); Kuo-Liang Chang Chien, Taipei (TW); Yao Chiang, Taipei (TW); Yu-Hsiang Chao, Taipei (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 16/904,860

(22) Filed: Jun. 18, 2020

Related U.S. Application Data

(60) Provisional application No. 62/929,373, filed on Nov. 9, 2019.

(51) Int. Cl.
*H04L 12/911* (2013.01)
*H04L 12/46* (2006.01)
(Continued)

(52) U.S. Cl.
CPC ........ *H04L 47/826* (2013.01); *H04L 12/4641* (2013.01); *H04L 41/0806* (2013.01);
(Continued)

(58) Field of Classification Search
CPC ... H04L 29/08135–08288; H04L 41/08–0803; H04L 41/0813–0836;
(Continued)

(56) References Cited

U.S. PATENT DOCUMENTS

| 10,432,537 B2 * | 10/2019 | Zhang ............... H04L 41/0896 |
| 2017/0134520 A1 * | 5/2017 | Abbasi ............... H04L 67/10 |

(Continued)

FOREIGN PATENT DOCUMENTS

| WO | 2012090573 A1 | 7/2012 |
| WO | 2016082867 A1 | 6/2016 |

(Continued)

OTHER PUBLICATIONS

I. Sarrigiannis, K. Ramantas, E. Kartsakli, P. Mekikis, A. Antonopoulos and C. Verikoukis, "Online VNF Lifecycle Management in an MEC-Enabled 5G IoT Architecture," in IEEE Internet of Things Journal, vol. 7, No. 5, pp. 4183-4194, May 2020.*

(Continued)

*Primary Examiner* — Brendan Y Higa
(74) *Attorney, Agent, or Firm* — ScienBiziP, P.C.

(57) ABSTRACT

A method for orchestrating resources in a multi-access edge computing (MEC) network is applied in and by an apparatus. The MEC network comprises at least one control node, substrate nodes and substrate links managed by the at least one control node. The apparatus receives a virtual network request and calculates whether a proper virtual network embedding solution for the virtual network request exists. If so, the apparatus hands the solution over to the at least one control node for implementation.

20 Claims, 14 Drawing Sheets

(51) Int. Cl.
*H04L 12/24* (2006.01)
*H04L 29/08* (2006.01)

(52) U.S. Cl.
CPC ...... *H04L 41/0823* (2013.01); *H04L 41/0876* (2013.01); *H04L 41/0893* (2013.01); *H04L 41/5051* (2013.01); *H04L 41/5054* (2013.01); *H04L 67/10* (2013.01)

(58) Field of Classification Search
CPC ... H04L 41/0876–0886; H04L 41/0893; H04L 41/12–16; H04L 41/5041–5054; H04L 67/10; H04L 67/1002–1036
See application file for complete search history.

(56) References Cited

U.S. PATENT DOCUMENTS

| | | | | |
|---|---|---|---|---|
| 2018/0143864 | A1* | 5/2018 | Takahashi | H04L 47/823 |
| 2018/0227243 | A1* | 8/2018 | Zhang | H04L 41/12 |
| 2020/0275313 | A1* | 8/2020 | He | H04L 47/826 |
| 2020/0310394 | A1* | 10/2020 | Wouhaybi | H04L 67/1048 |
| 2020/0351900 | A1* | 11/2020 | Zhang | H04M 15/8044 |
| 2021/0014114 | A1* | 1/2021 | Doshi | H04L 41/0806 |
| 2021/0014133 | A1* | 1/2021 | Maciocco | H04L 43/0882 |

FOREIGN PATENT DOCUMENTS

| | | |
|---|---|---|
| WO | 2016082868 A1 | 6/2016 |
| WO | 2017191489 A1 | 11/2017 |

OTHER PUBLICATIONS

D. Dietrich, A. Rizkand P. Papadimitriou, "Multi-domain virtual network embedding with limited information disclosure," 2013 IFIP Networking Conference, Brooklyn, NY, 2013, pp. 1-9.*

Y. Chiang, Y. Chao, C. Hsu, C. Chou and H. Wei, "Virtual Network Embedding With Dynamic Speed Switching Orchestration in Fog/Edge Network," in IEEE Access, vol. 8, p. 84753-84768, 2020.*

* cited by examiner

METHOD AND APPARATUS FOR ORCHESTRATING RESOURCES IN MULTI-ACCESS EDGE COMPUTING (MEC) NETWORK

CROSS-REFERENCE TO RELATED APPLICATION

This application claims priority to U.S. Provisional Patent Application No. 62/929,373, filed on Nov. 1, 2019, and entitled "System and Method for Virtual Network Embedding with Dynamic Speed Switching Orchestration", the contents of which are incorporated by reference herein.

FIELD

The subject matter herein generally relates to resource allocation.

BACKGROUND

Mapping multiple virtual networks onto a substrate network is a major challenge in resource allocation in network virtualization and usually referred to as virtual network embedding (VNE).

Most VNE tasks are in a signal data center environment, or focused on offline solutions. Such VNE methods cannot be carried out in a Multi-access Edge Computing (MEC) network environment, which consists of distributed MEC servers in different edge areas.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
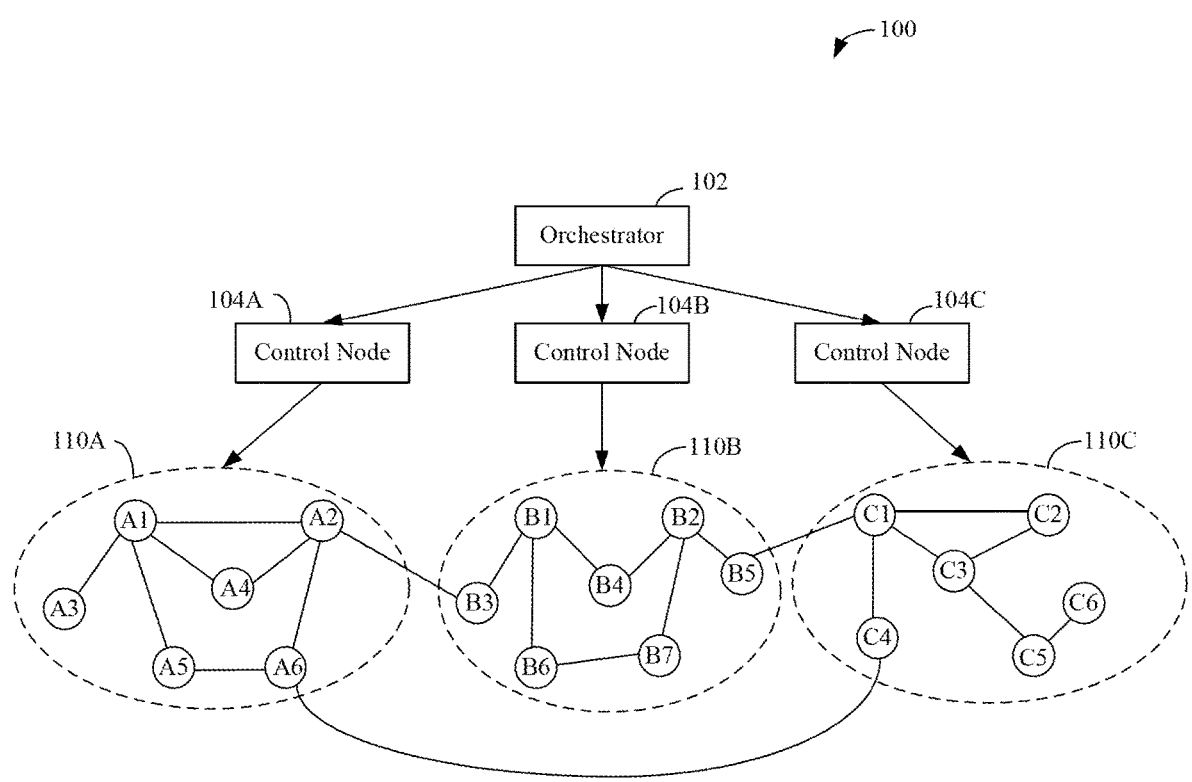
FIG. 1 is a block diagram of one embodiment of a Multi-access Edge Computing (MEC) network framework.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a Multi-access Edge Computing (MEC) network framework 100 according to an embodiment. The MEC network framework 100 comprises an orchestrator 102, a plurality of control nodes 104A, 104B, and 104C, and a plurality of edge areas 110A, 110B, and 110C.

The orchestrator 102 is configured to provide real-time resource orchestration, comprising configuration of virtual and physical network functions. The orchestrator 102 comprises access points that allow access to users and third parties in order to subscribe to applications or deploy servers. When the orchestrator 102 receives a Virtual Network Request (VNR), the orchestrator 102 calculates a Virtual Network Embedding (VNE) solution based on resource usage information. The VNR and the VNE solution are then handed over to at least one control node among 104A-104C to implement the VNE solution.

Each control node 104A, 104B, and 104C is configured for preparing the virtualized infrastructure, and reporting resource information. Each control node 104A, 104B, and 104C is configured to manage the resource of computing nodes A1-A6, B1-B7, and C1-C6 and substrate links in its edge areas 110A, 110B, and 110C respectively, such as resource allocation and power management. Each control node 104A, 104B, and 104C is configured to manage the computing nodes A1-A6, B1-B7, and C1-C6 in a specific geographical location. Accessing computing nodes in different edge areas is usually not allowed, for management efficiency and security issues. After receiving the VNE solution from the orchestrator 102, the control nodes 104A-104C implement the VNE procedure to the edge areas 110A-110C which it manages. The control nodes 104A, 104B, and 104C comprise all kinds of Virtualized Infrastructure Management (VIM), such as OpenStack, Kubernetes, and ONAP, which are functions that are used to control and manage the virtualized infrastructure under the authority of an operator of an infrastructure provider.

The computing nodes A1-A6, B1-B7, and C1-C6 are the basic process elements in the edge areas 110A, 110B, and 110C respectively, and each computing node A1-A6, B1-B7 and C1-C6 may be able to connect with each other through a substrate link. The computing nodes A1-A6, B1-B7, and C1-C6 comprise resources which are limited, such as memory storage, CPU, or GPU offering services to users. Each computing node belongs to a control node, and takes orders from the control node, for example, the computing nodes A1-A6, and the control node 104A. When a virtual node is embedded in the computing node, the computing node starts working, providing data storage, instruction processing, etc.

Each edge area 110A-110C can connect with others through substrate links, but propagation delay is much higher than the propagation delay inside the same edge area. Each edge area is managed by the control node, the control node executes the VNE resource allocation in the edge area it controls, for example, the edge area 110A and the control node 104A.

In one embodiment, when the orchestrator 102 receives a VNR from one edge area, for example the edge area 110A, it calculates the VNE solution, and then hands over the VNE solution to the control node 104A nearest to the origin of the VNR. The control node 104A can execute the VNE solution inside the edge area 110A it controls. If the VNE solution from the orchestrator 102 is to embed the VNR across multiple edge areas, the orchestrator 102 will hand the VNR over to a corresponding control node to execute.

Figure 2:
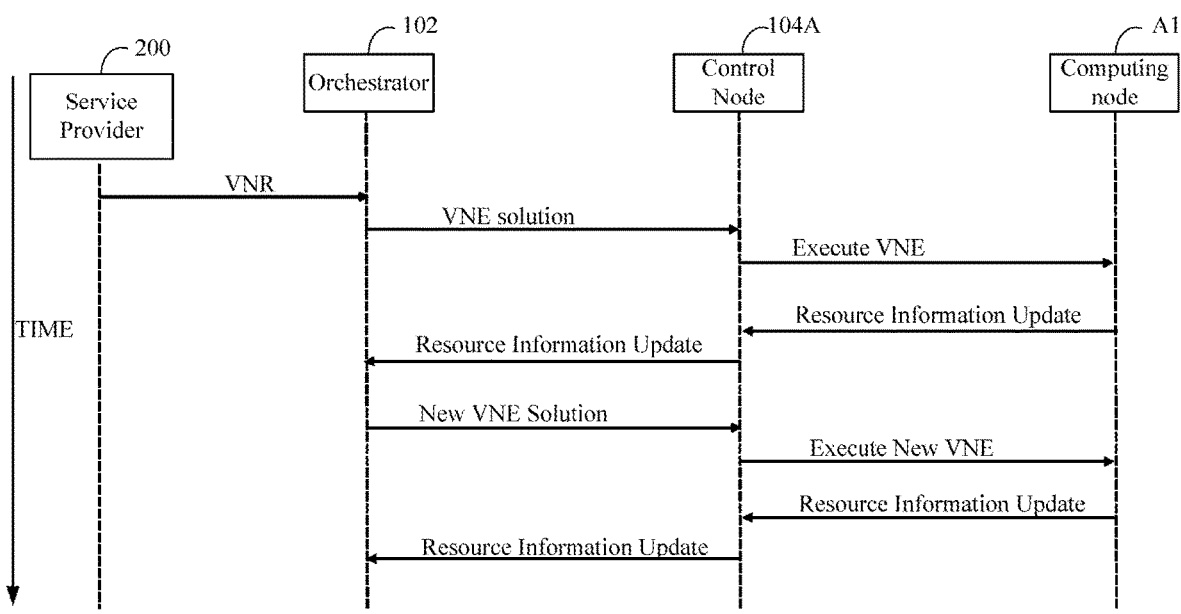
FIG. 2 is a sequence chart of one embodiment of a message exchange flow of FIG. 1.

FIG. 2 is a diagram of an example of message exchange flow over time between a service provider 200, the orchestrator 102, the control node 104A, and the computing node A1. The orchestrator 102 receives a VNR from the service provider 200 as an input, and calculates a VNE solution based on the processing requirements of the VNR and the resource usage information. If there is no proper VNE solution, the orchestrator 102 will reject the VNR. If otherwise, the orchestrator 102 hands the VNR and the VNE solution over to one or more control nodes, for example, the control node 104A. The control node 104A implements the VNE solution. After the VNR is embedded, all the computing nodes managed by the control node 104A should report resources and information thereon to the control node 104A. The resource report is then forwarded to the orchestrator 102 by the control node 104A, so that the orchestrator 102 can find a new solution. The information as to resource usage is updated by the orchestrator 102 based on the resource report.

In one embodiment, computing nodes and networks in the edge area are represented by substrate nodes and substrate networks, respectively. Each substrate network comprises substrate nodes and substrate links. Each substrate node has attributes, which comprise processing capacity and geographic region. The geographic region indicates the edge area in which the substrate node is located. Each substrate node comprises a plurality of cores, and each substrate node is configured in one of two modes, the modes include a standard mode and an asymmetric mode. For the standard mode, all the plurality of cores of the substrate node are working on the same standard speed. For the asymmetric mode, parts of the plurality of cores work on a first speed higher than the standard speed while remainder of the plurality of cores work on a second speed lower than the standard speed. When the substrate node is configured as the asymmetric mode, the substrate node can dynamically lower the processing speed of low priority tasks in order to increase the processing speed of high priority tasks. The processing capacities of the substrate nodes are measured by the number of instructions that can be done per time unit. Each substrate link between two substrate nodes has attributes, which comprise processing capacity and delay time. The processing capacity of each of the substrate links comprises bandwidth.

In one embodiment, the virtual network is modeled as an Activity on Vertex (AOV) topology. The MEC applications are modeled in service chain topologies. The MEC applications are abstracted into multiple processes, and the traffic of the MEC applications go through the processes in a pre-defined order. The VNR for the MEC applications is formatted as an AOV network request, and all the virtual nodes in the VNR are in a service order. The instructions on a virtual node will start to be processed after the previous virtual nodes and virtual links finish their procedure. The resource is released when the virtual nodes or virtual links finish their procedure. In one embodiment, the processing requirements of the VNRs comprise a priority level, latency requirements, processing requirements of the virtual nodes, and processing requirements of the virtual links. In one embodiment, there are two constraints for mapping virtual nodes onto a given substrate network. The first constraint is that a VNR with high-priority or low-latency requirement, such as video application or vehicle-to-vehicle communications, can only be mapped on the high-speed or standard-speed cores, in order to meet the QoE requirements. The second constraint is that a VNR with low-priority or non-sensitive to latency, such as some IoT applications, can only be mapped on standard-speed or low-speed cores at the first time of embedding, except the first virtual node. The control node monitors the computing resource in its edge area and reports to the orchestrator. When there are available computing resources in the high-speed cores of a substrate node, the mapped virtual nodes can be dynamically switched by the orchestrator to these cores, to increase the processing speed.

In one embodiment, the processing requirement of the virtual node of the VNR comprises the number of instructions that needs to be processed, and the processing requirement of the virtual link of the VNR comprises the bandwidth.

FIGS. 3A-3I illustrate schematic diagrams of virtual network embedding according to the embodiment.

Figure 3A:
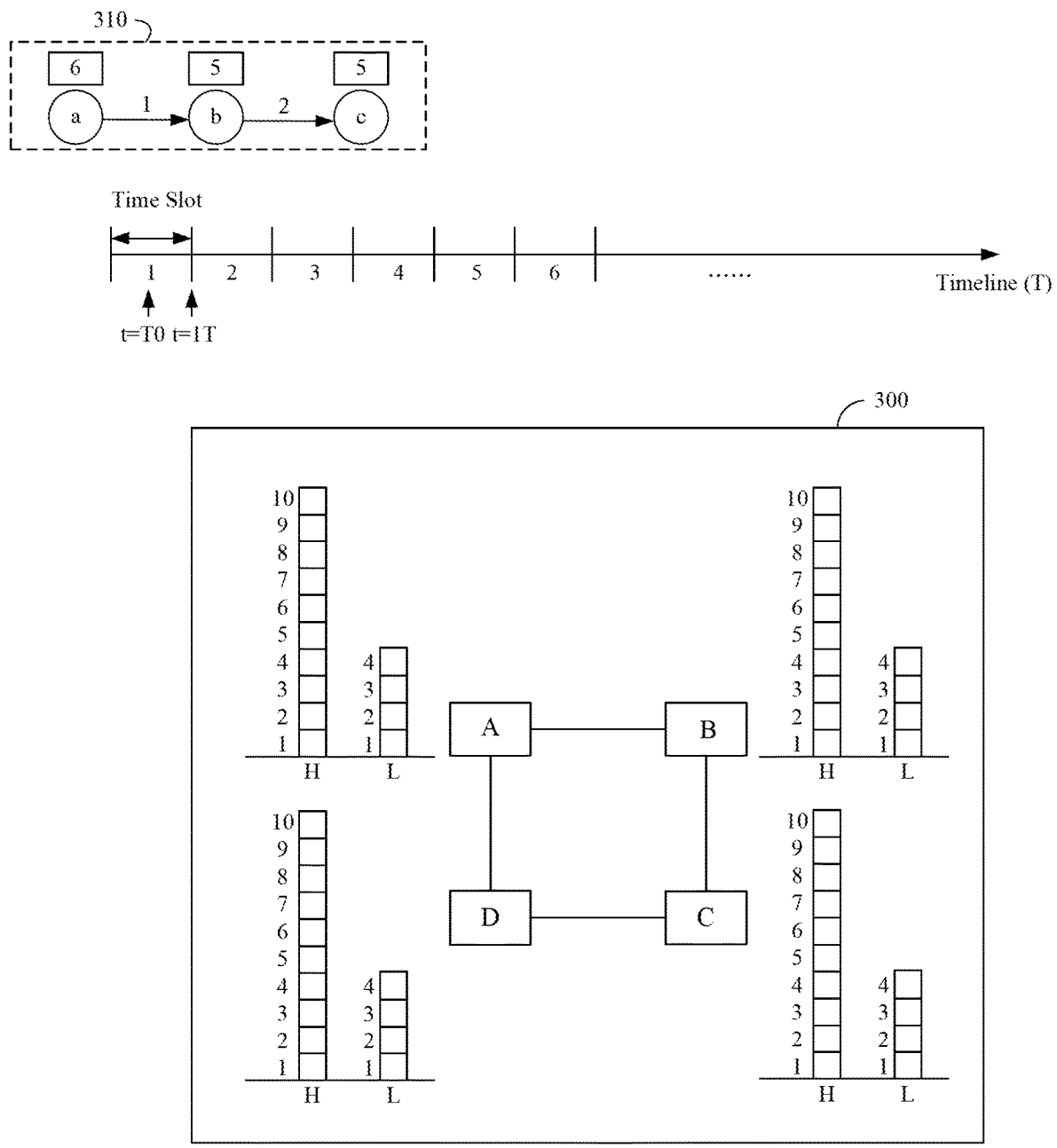
FIGS. 3A, 3B, 3C, 3D, 3E, 3F, 3G, 3H, and 3I are schematic diagrams of the embedding of a virtual network in one embodiment.

FIG. 3A shows a substrate network 300 comprising a plurality of substrate nodes, the substrate nodes are labelled A, B, C, and D. The substrate nodes A, B, C, and D are interconnected by substrate links. The substrate network 300 is managed by an infrastructure provider, and the virtual network may be established by the infrastructure provider on behalf of a service provider. In this example, each of the substrate nodes A, B, C, and D is configured in the asymmetric mode, the processing capacity of high-speed cores is 10, and the processing capacity of low-speed cores is 4. The service provider provides various services to users, and can create virtual networks, each virtual network offers a customized service in a specific scenario. The virtual network comprises several virtualized network functions, called virtual nodes. These virtual nodes are connected by virtual links, which require bandwidth resources. The service provider hands each virtual network to the infrastructure provider in a VNR format. In this example, the virtual network embedding is initiated by a VNR 310 with low-priority requirement received from the service provider at the time T0 (t=T0). A virtual network requested by the VNR 310 has an AOV topology. The virtual network comprises three virtual nodes (labelled a, b, and c) in a chain, the numbers that appear in blocks above the virtual nodes a, b, and c indicate the processing requirement of the virtual node. Also, the number that appears next to the various virtual links indicates the bandwidth requirement of the virtual link. In this embodiment, the orchestrator of the infrastructure provider collects input requests during a time window and then starts to allocate resources to satisfy their requirements in the next time window. In this example, the time window is configured as one time slot, the VNR 310 is received at t=T0, and will be processed by the orchestrator at t=1 T. The orchestrator has information as to resource usage of the whole substrate network 300, and will calculate a VNE solution and reserve resources for the VNR 310. FIGS. 3B-3H illustrate resources reserved, scheduled by the orchestrator for mapping the VNR 310 onto the substrate network 300 in every time slot.

Figure 3B:
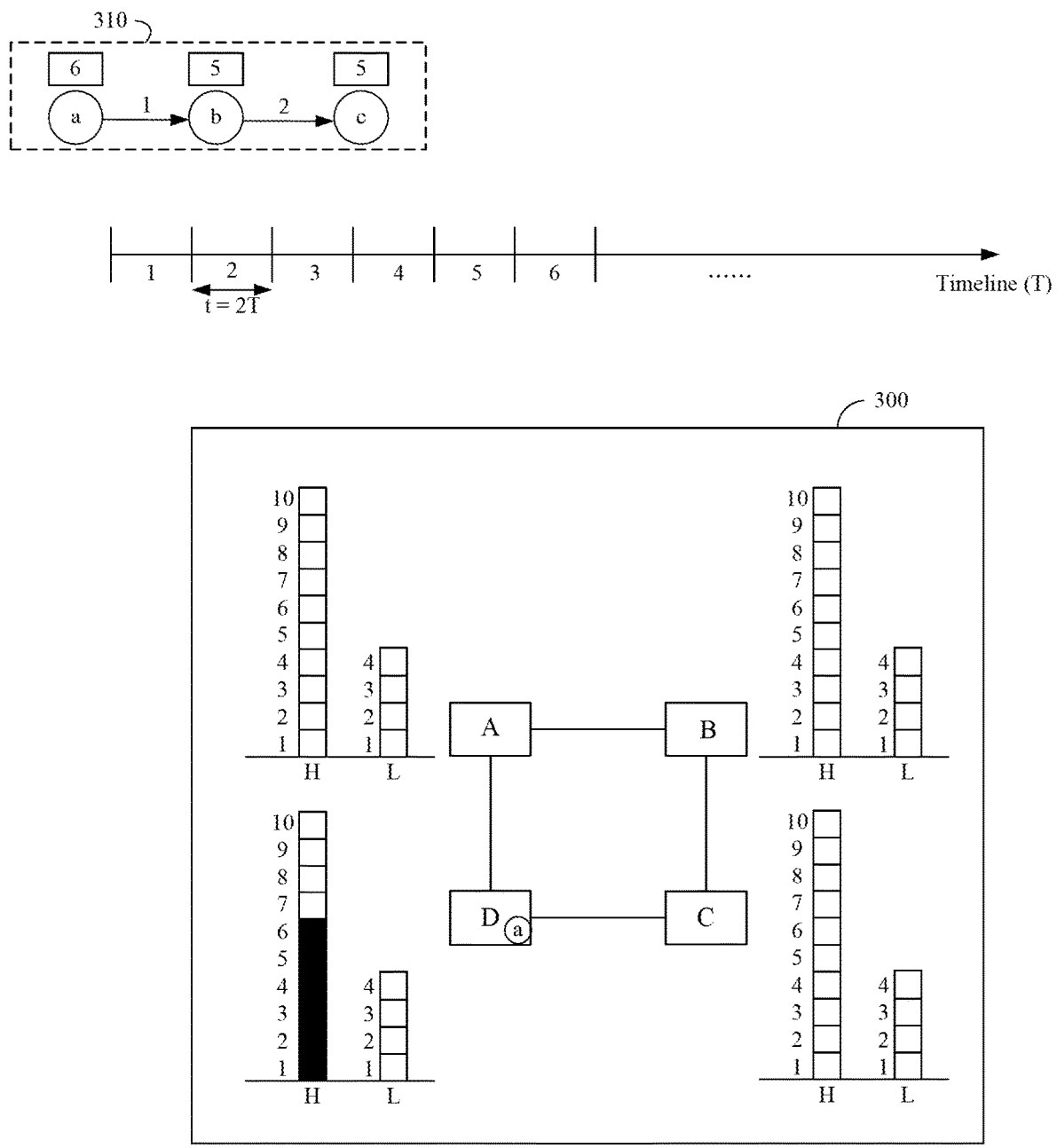

FIG. 3B shows resources reserved within that VNE solution for the VNR 310 during t=2 T. As described above, the first virtual node of the low priority VNR can be mapped on high-speed or standard-speed cores for the first embedding, if there is an available resource. In this example, the virtual node a is mapped on the high-speed cores of the substrate node D and occupies six resources.

Figure 3C:
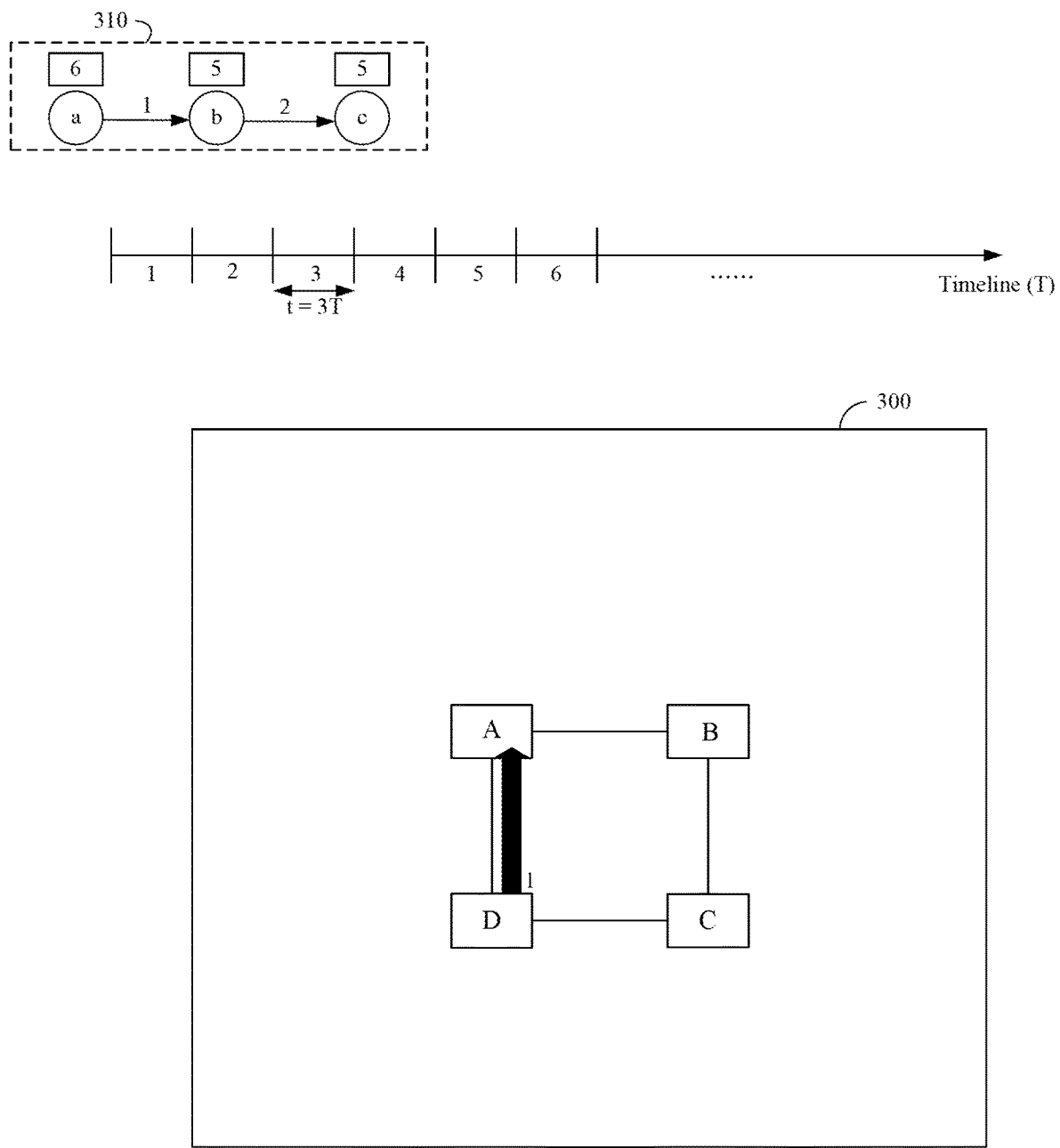

FIG. 3C shows resources reserved for the VNR 310 during t=3 T. In this embodiment, a transmission delay of services through virtual links is considered. Instructions that have been processed will experience delay as they are transmitted through a substrate link connecting two substrate nodes. The transmission delay is represented in terms of time slots. The substrate link, on which a virtual link is mapped, will reserve bandwidth and time slots for the virtual link. The transmission delay can be calculated by the number of megabytes generated after instructions have been processed and which need to be carried through a virtual link, and the processing capacity of the substrate link on which the virtual link is mapped. In this example, the transmission delay is assumed to be one time slot, and the substrate links (D, A), on which the virtual links (a, b) are mapped, will reserve bandwidth and one time slot for virtual links (a, b).

Figure 3D:
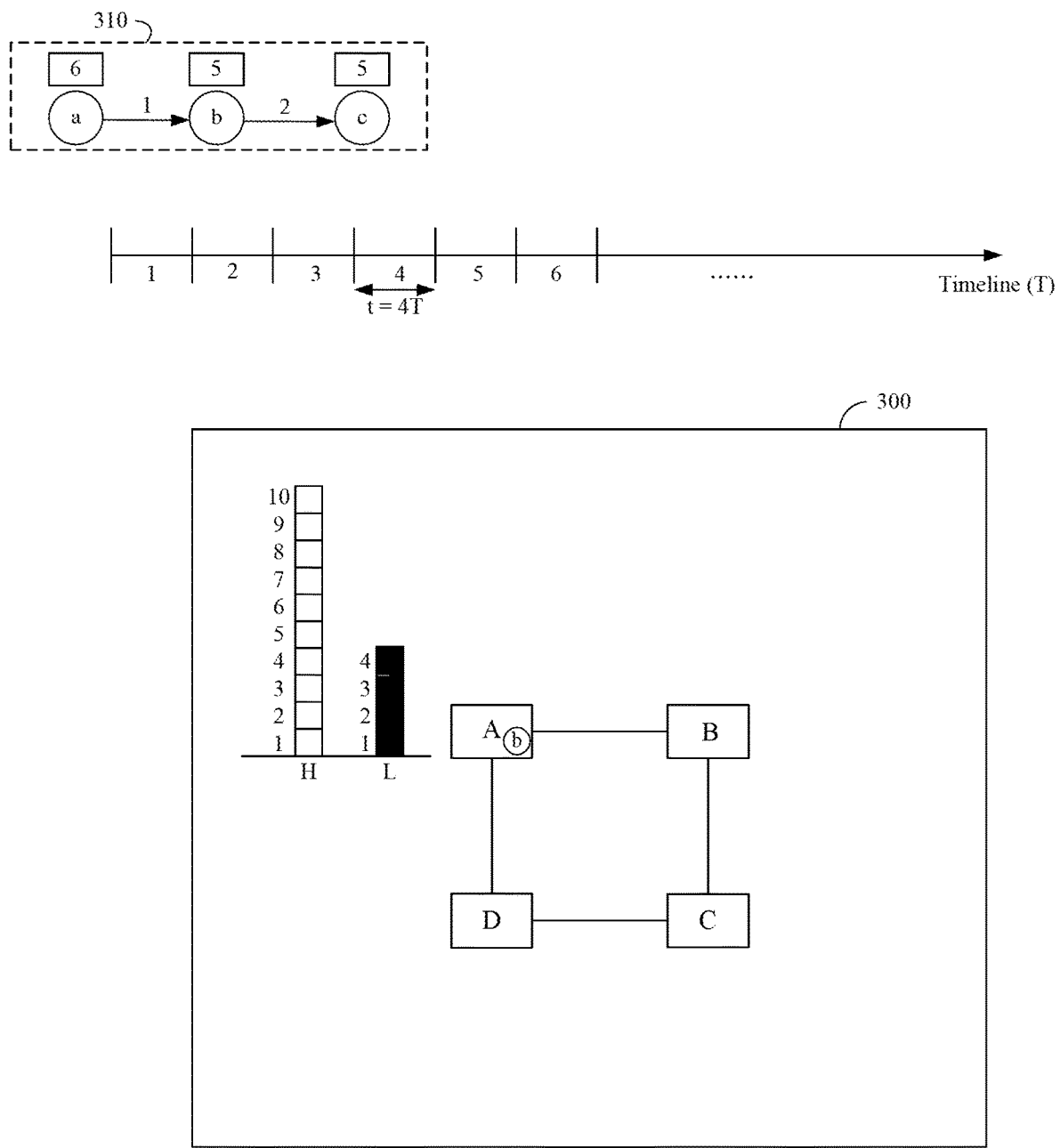
Figure 3E:
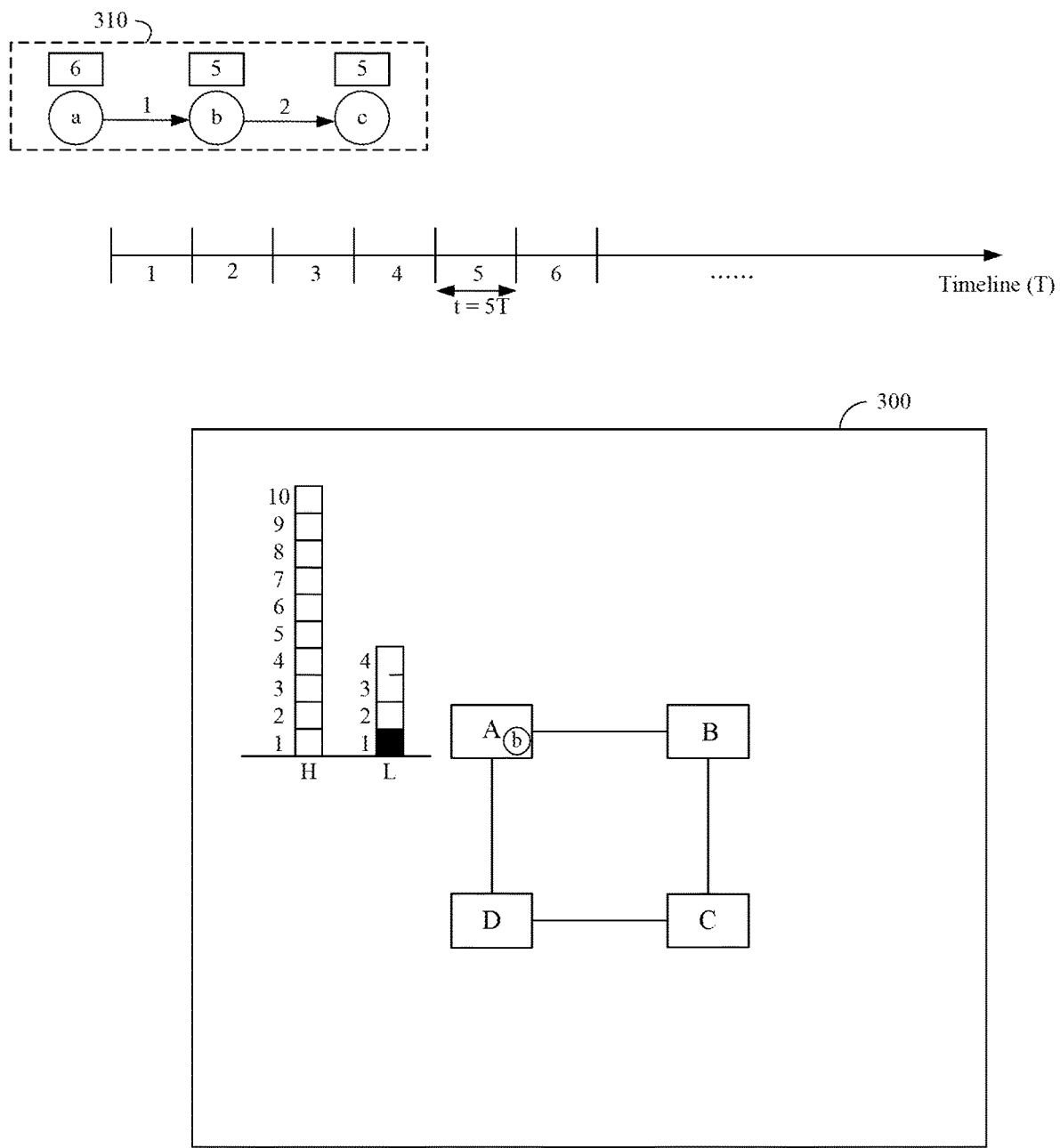

FIGS. 3D and 3E show resources reserved for the VNR 310 during t=4 T and 5 T, respectively. As described above, the other virtual nodes of the low priority VNR can only be mapped on low-speed or standard-speed cores for the first embedding. In this example, the virtual node b can only be mapped on the low-speed cores of the substrate node A. However, the execution of instructions of the virtual node on the substrate node will introduce a processing delay. The processing delay can be calculated by the processing requirement of the virtual node and the processing capacity of the substrate node on which the virtual node is mapped. In this example, since the processing capacity of the low-speed cores of the substrate node A is only four and the processing requirement of the virtual node b is five, the processing delay of the virtual node b is two time slots, and the substrate node A needs to reserve two time slots for the virtual node b to finish its procedure.

Figure 3F:
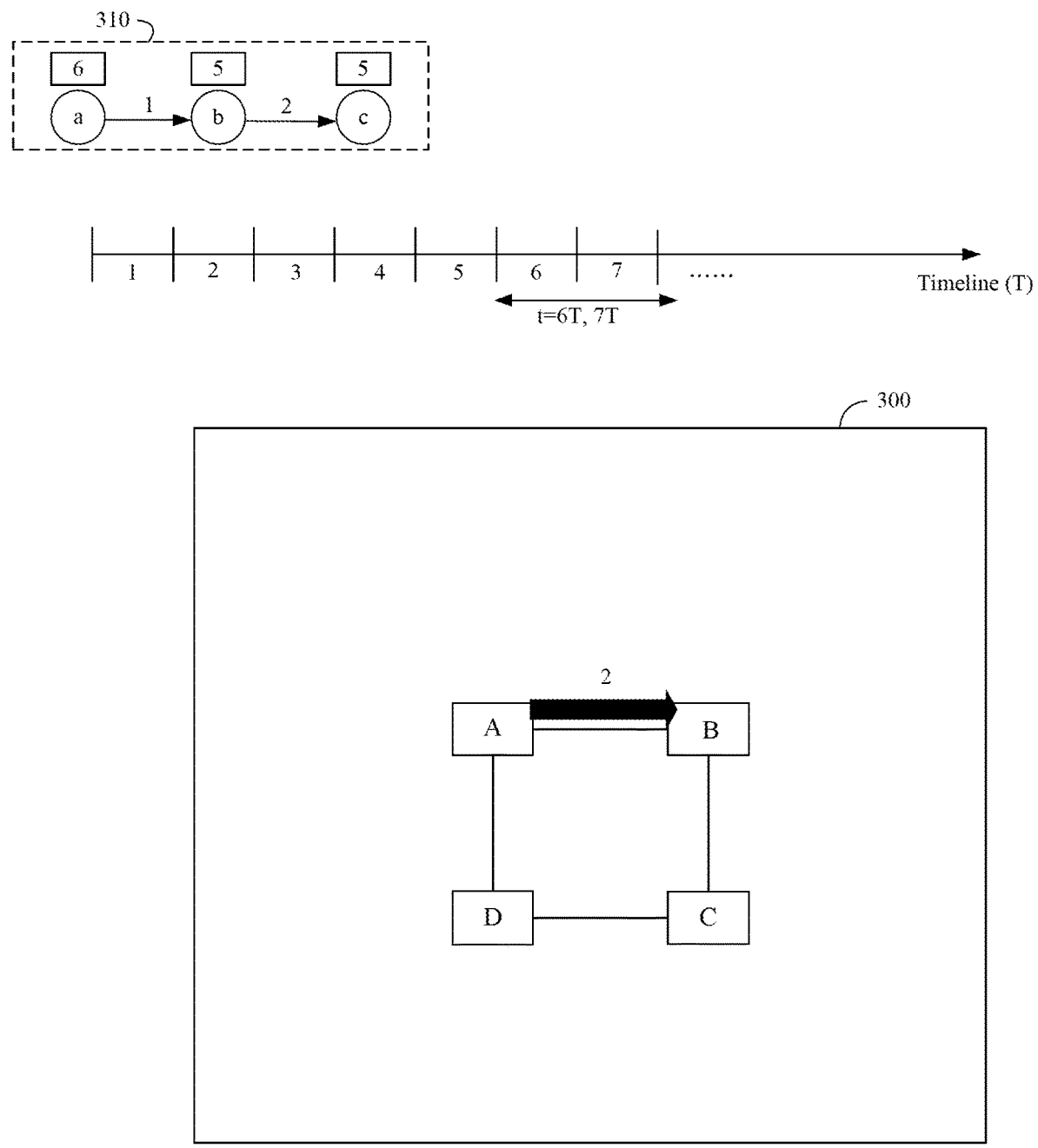

FIG. 3F shows resources reserved for the VNR 310 during t=6 T and t=7 T. In this example, the transmission delay for the virtual links (b, c) is assumed to be two time slots, so the substrate links (A, B), on which the virtual links (b, c) are mapped, will reserve bandwidth and two time slots (these being 6 T and 7 T) for the virtual links (b, c).

Figure 3G:
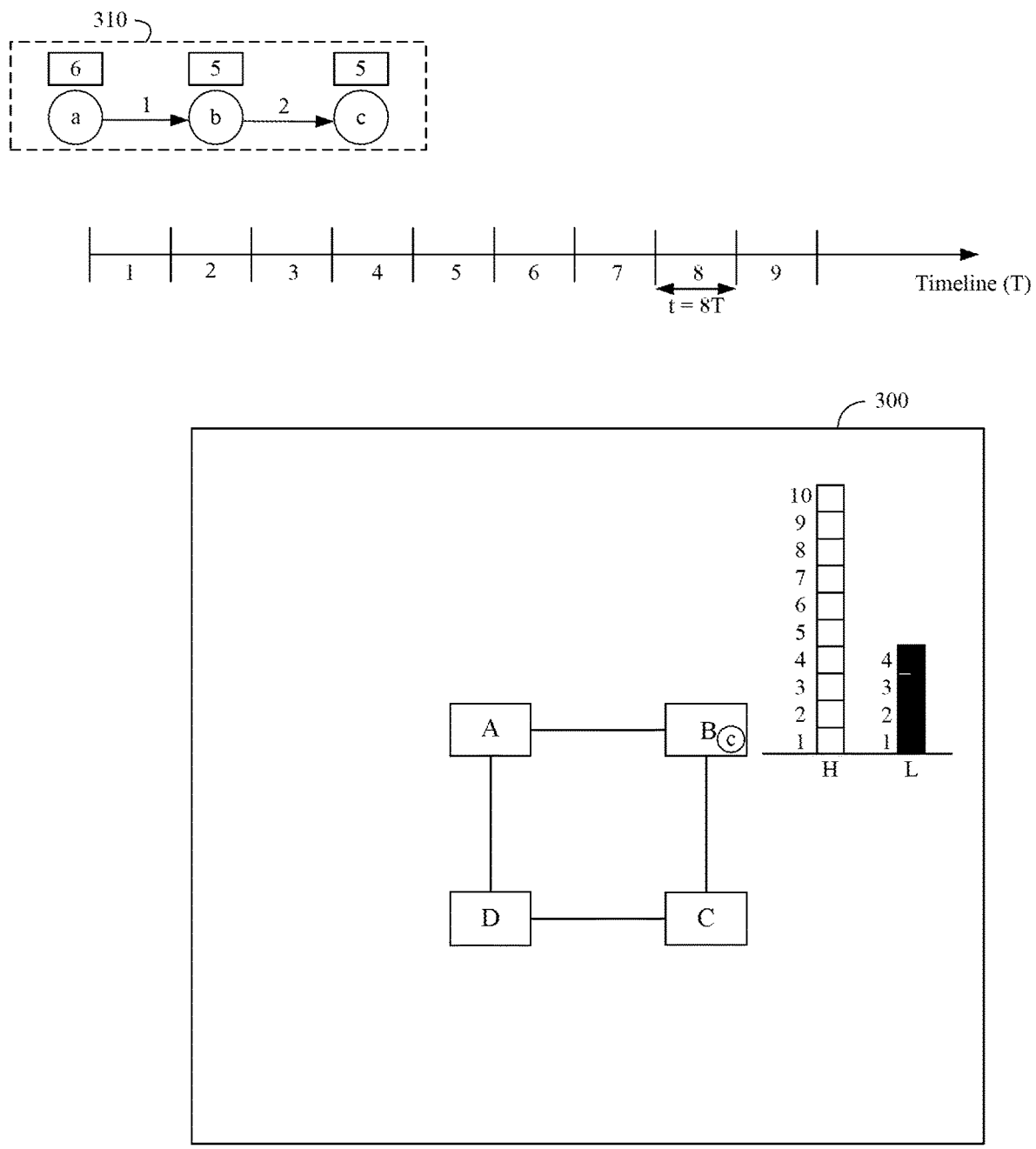
Figure 3H:
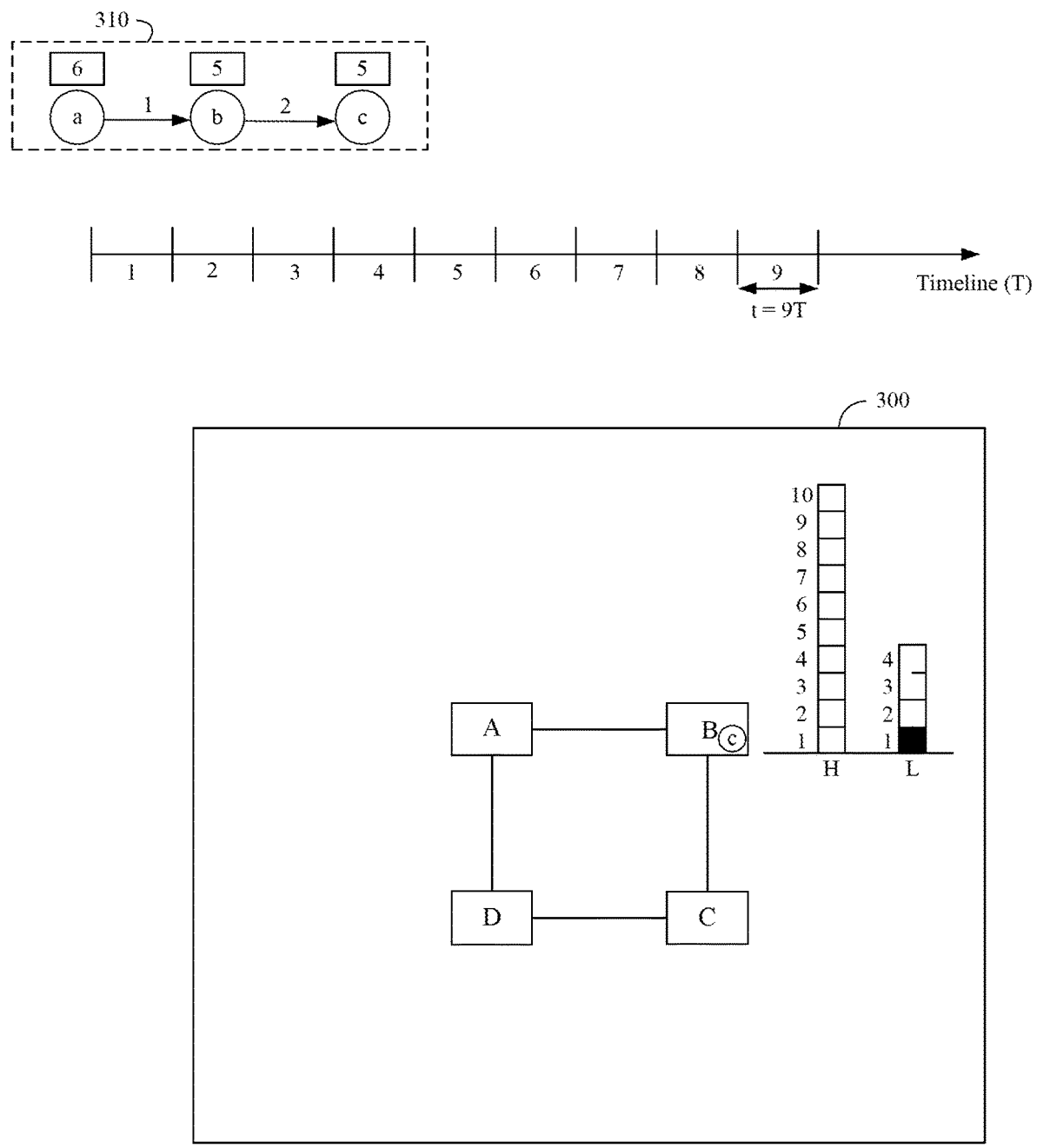

FIGS. 3G and 3H show resources reserved for the VNR 310 during t=8 T and 9 T, respectively. As described above, the other virtual nodes of the low priority VNR can only be mapped on low-speed or standard-speed cores for the first embedding. In this example, the virtual node c can only be mapped on the low-speed cores of the substrate node B. In this example, since the processing capacity of the low-speed cores of the substrate node B is only four and the processing requirement of the virtual node b is five, the processing delay of the virtual node c is two time slots and two time slots need to be reserved by the substrate node B for the virtual node b to finish its procedure.

Figure 3I:
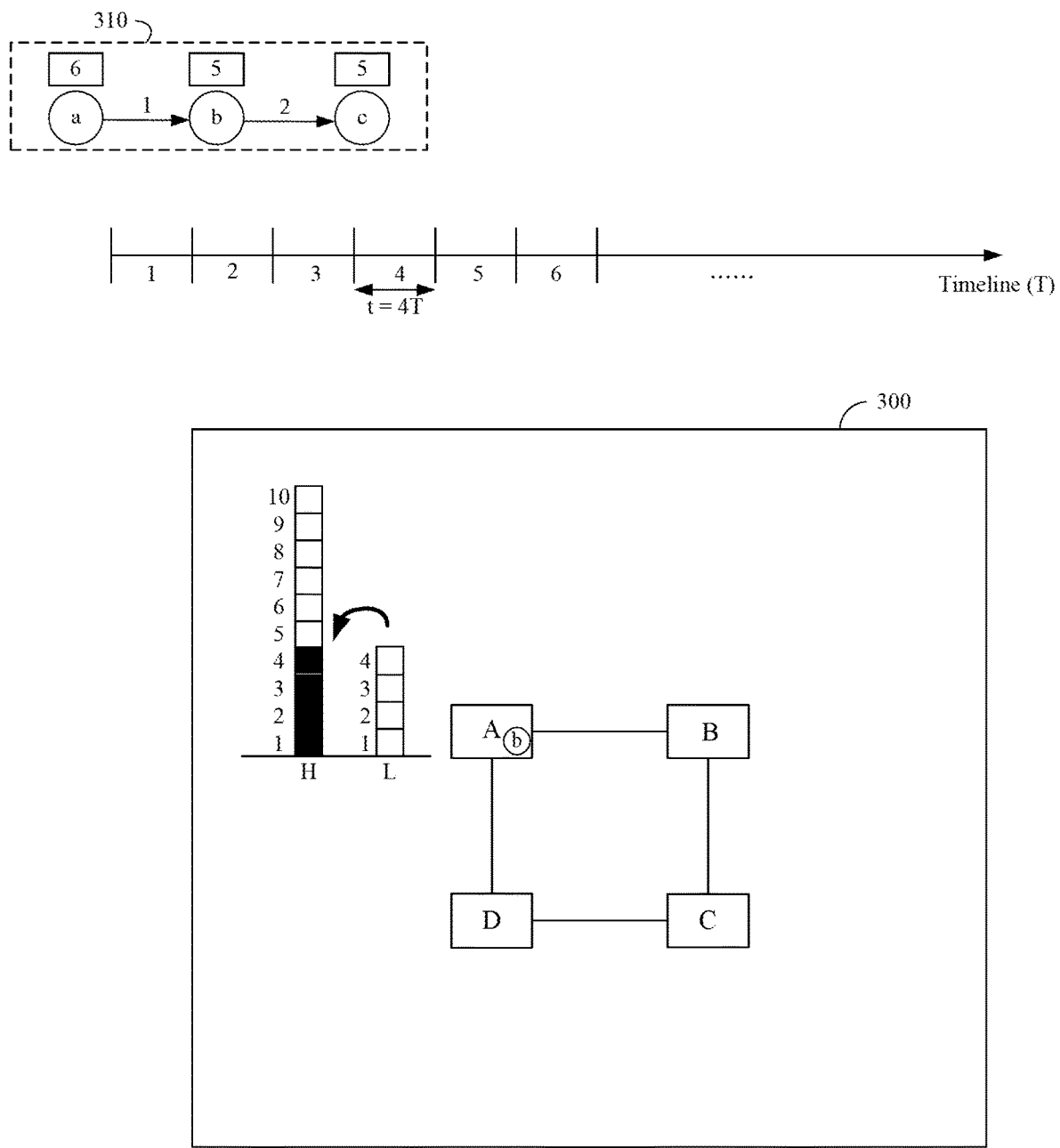

FIG. 3I illustrates an orchestration of resources executed by the orchestrator for the VNR 310, while resources are available.

As previously described, the orchestrator receives information as to resources transmitted by the control nodes, which is reported by the computing nodes, and resources usage is updated according to the information received. The orchestrator has resource usage information of the substrate network, and the orchestrator can thus orchestrate the resource allocation in every time slot. In this example, it is assumed the substrate network 300 currently serves the VNR 310 only. The orchestrator detects there are available resources on the high-speed cores of the substrate node A during t=4 T according to the resource usage information, and calculates a new solution for the VNR 310. The orchestrator informs the control node which manages the substrate network 300 of the new solution, to migrate the instructions on the low-speed cores of the substrate node A to the high-speed cores of the substrate node A. For the new solution, the processing delay of the virtual node b will be reduced to one time slot due to sufficiency of processing capacity on the high-speed cores of the substrate node A, and the resources of the low-speed cores which were originally reserved will be released at the same time. The released resources can be used by the orchestrator to map other low priority VNRs in the same amount of time and, over the long term, increase revenues.

Besides the processing delay and the transmission delay, a propagation delay is also a critical issue in the MEC network environment. In one embodiment, it is assumed that the geographical distance between two edge areas is far, such as being in different cities. Therefore, the packets transmitted through a substrate link across edge areas will experience the propagation delay. The propagation delay between two edge areas will be much higher than any delay in the same edge area. In one example, the propagation delay can be calculated by the geographical distance of a substrate link which crosses edge areas, and the wave propagation speed of the substrate link, and can be converted into time slots. In another example, the propagation delay can be obtained through a simplified method, such as a look up table. The goal of the orchestrator is to minimize the total processing time of each VNR in addition to utilizing substrate resources efficiently, so that the infrastructure provider can accept more VNRs in the same amount of time. In one embodiment, the total processing time of a VNR can be calculated by the processing delay, the transmission delay, and the propagation delay.

Figure 4:
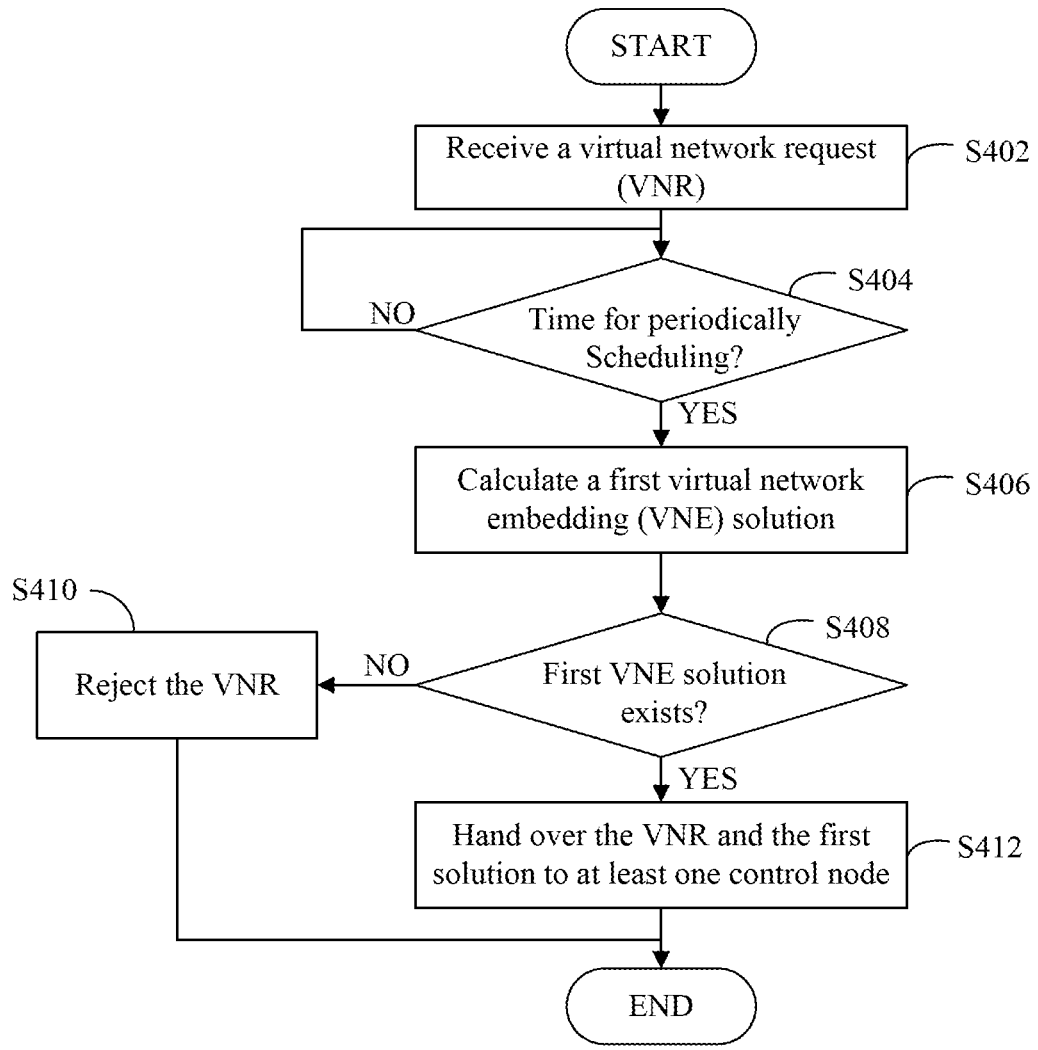
FIG. 4 is a flowchart of one embodiment of a method for resource orchestration.

FIG. 4 illustrates a flowchart of a method for orchestrating resources according to one embodiment.

In step S402, the orchestrator 102 receives a virtual network request (VNR). The VNR has an Active on Vertex (AOV) topology with a plurality of virtual nodes interconnected by virtual links. The orchestrator 102 stores the received VNR in a queue.

In step S404, the orchestrator 102 determines whether a time window for periodic scheduling is arrived. If the orchestrator 102 determines that the time window for periodic scheduling is arrived, the orchestrator 102 takes the VNR from the queue and then executes step S406 for the VNR. Otherwise, if the time window for periodic scheduling is not arrived, the orchestrator 102 waits for such arrival.

In step S406, the orchestrator 102 calculates a first Virtual Network Embedding (VNE) solution for the VNR according to the process requirements of the VNR, resource usage information, and the attributes of substrate nodes and substrate links. The processing requirements of the VNR comprise a priority level, latency requirements, processing requirements of the virtual nodes, and the processing requirements of the virtual links. The resource usage information reveals the available processing capacities of the substrate nodes and the available processing capacities of the substrate links.

In step S408, the orchestrator determines whether there is a first VNE solution for the VNR. When the calculations show no proper VNE solution for the VNR, the orchestrator determines that the first VNE solution does not exist. If the orchestrator determines that a first VNE solution does not exist, the orchestrator rejects the VNR, in step S410. If the orchestrator determines that a first VNE solution exists, the orchestrator executes step S412.

In step S412, the orchestrator hands over the VNR and the first VNE solution for the VNR to at least one control node. Specifically, if the first VNE solution comprises substrate nodes crossing different edge areas, the orchestrator hands over the VNR and the first VNE solution to control nodes corresponding to the edge areas. If the first VNE solution comprises substrate nodes which are all located in a same edge area, the orchestrator 102 hands over the VNR and the first VNE solution to the control node corresponding to the edge area.

Figure 5:
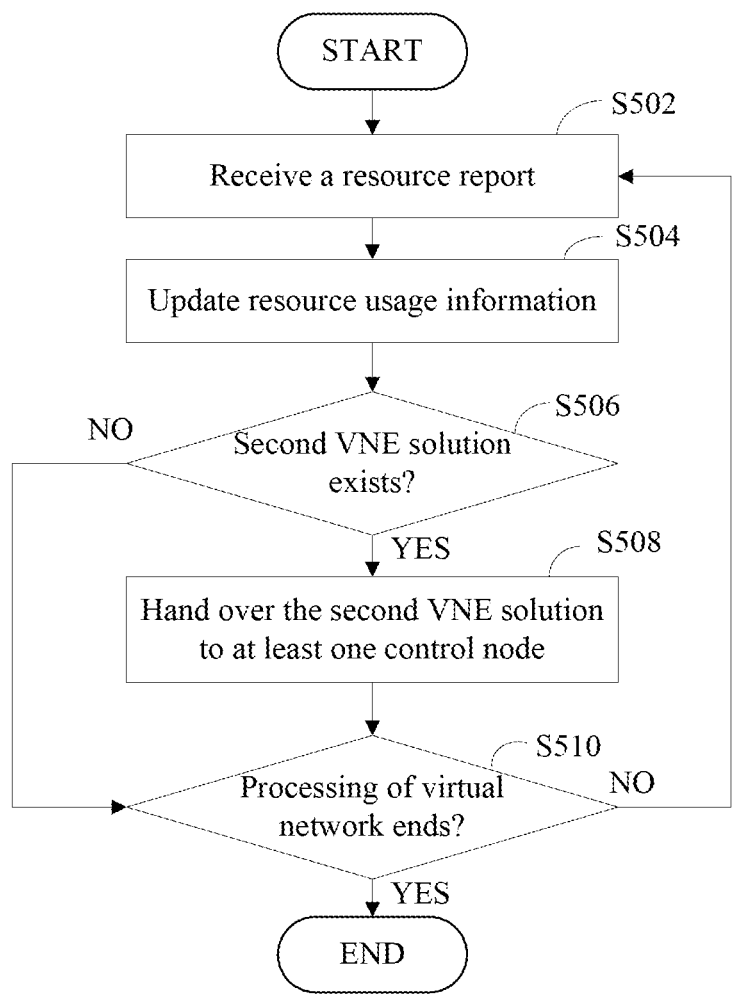
FIG. 5 is a flowchart of another embodiment of a method for resource orchestration.

FIG. 5 illustrates a flow chart of another embodiment comprising further steps of the method of FIG. 4. In this embodiment, each of the substrates nodes sends reports as to resources to the corresponding control node, and the control nodes report such information to the orchestrator 102 periodically.

In step S502, the orchestrator 102 receives a resource report. The resource report is transmitted by a control node, and the resource report comprises available processing capacities of the substrate nodes and available processing capacities of the substrate links managed by the control node.

In step S504, the orchestrator 102 updates resource usage information based on the received resource report.

In step S506, the orchestrator 102 calculates a second VNE solution based on the processing requirements of the VNR and the updated resource usage information, and determines whether a second VNE solution for the VNR exists. The second VNE solution has shorter processing time than that of the first VNE solution. If a second VNE solution exists, the orchestrator 102 executes step S508, otherwise, the orchestrator 102 executes step S510.

In step S508, the orchestrator 102 hands the second VNE solution over to at least one control node.

In step S510, the orchestrator 102 determines whether the processing of the virtual network of the VNR is completed. If not completed the orchestrator 102 executes step S502, otherwise, the orchestrator 102 ends this procedure of the method.

Figure 6:
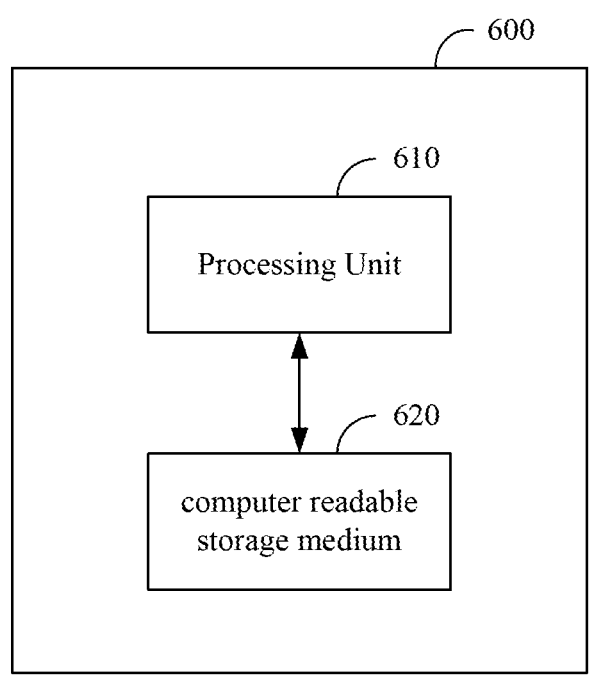
FIG. 6 is a block diagram of one embodiment of an apparatus for orchestrating resources.

FIG. 6 illustrates an apparatus 600 according to an embodiment. The apparatus 600 works as the orchestrator 102. The apparatus 600 comprises a processing unit 610, and a computer readable storage medium 620. The processing unit 610 is electrically connected to the computer readable storage medium 620. The processing unit 610 comprises a microcontroller, a microprocessor, or other circuit with arithmetic processing capabilities, and executes or processes instructions, data, and computer programs stored in the computer readable storage medium 620. The computer readable storage medium 620 comprises a read-only memory (ROM), a random access memory (RAM), a magnetic disk storage medium device, an optical storage medium device, a flash memory device, electrical, optical, or other physical/tangible (e.g., non-transitory), etc. A computer-readable storage medium is used to store one or more computer programs that control the operation of the apparatus 600, and executed by the processing unit 610. In the embodiment, the computer readable storage medium 620 stores or encodes one or more computer programs, and stores models, configurations, and computing parameters data, for the processing unit 610, to execute the methods shown in FIGS. 4 and 5.

The embodiments shown and described above are only examples. Many details are often found in the art, therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for resource orchestration in a multi-access edge computing (MEC) network, the method comprising:
receiving a virtual network request (VNR);
determining whether a time window for periodically scheduling the VNR has arrived;
calculating a first virtual network embedding (VNE) solution for the VNR according to processing requirements of the VNR, resource usage information, attributes of substrate nodes of the MEC network, and attributes of substrate links of the MEC network when the time window has arrived;
determining whether the first VNE solution exists; and
handing the VNR and the first VNE solution over to at least one control node in the MEC network when the first VNE solution exists; otherwise,
rejecting the VNR.

2. The method of claim 1, further comprising:
receiving a resource report;
updating the resource usage information according to the received resource report;
calculating a second VNE solution for the VNR according to the processing requirements of the VNR, the updated resource usage information, the attributes of the substrate nodes of the MEC network, and the attributes of the substrate links of the MEC network;
determining whether the second VNE solution exists; and
handing over the second VNE solution to the at least one control node if the second VNE solution exists.

3. The method of claim 1, wherein a virtual network requested in the VNR comprises an active on vertex topology.

4. The method of claim 3, wherein the processing requirements of the VNR comprise a priority level, latency requirements, processing requirements of virtual nodes of the virtual network, and processing requirements of virtual links of the virtual network.

5. The method of claim 4, wherein the processing requirements of the virtual nodes comprise the number of instructions.

6. The method of claim 4, wherein the processing requirements of the virtual links comprise bandwidth.

7. The method of claim 1, wherein each of the attributes of the substrate nodes comprises processing capacity and geographic region, and the processing capacity comprises the number of instructions can be done per time unit.

8. The method of claim 1, wherein each of the attributes of the substrate links comprises processing capacity and delay time, and the processing capacity comprises bandwidth.

9. The method of claim 2, wherein the received resource report comprises available capacities of the substrate nodes and available processing capacities of the substrate links.

10. The method of claim 2, wherein the second VNE solution has a shorter processing time for the VNR than the first VNE solution.

11. An apparatus for resource orchestration in a multi-access edge computing (MEC) network, the apparatus comprising:
 a processing unit; and
 a computer readable storage medium for storing at least one computer program, wherein the at least one computer program comprises instructions which are executed by the processing unit, and performs a method comprising:
  receiving a virtual network request (VNR);
  determining whether a time window for periodically scheduling the VNR has arrived;
  calculating a first virtual network embedding (VNE) solution for the VNR according to processing requirements of the VNR, resource usage information, attributes of substrate nodes of the MEC network, and attributes of substrate links of the MEC network when the time window has arrived;
  determining whether the first VNE solution exists; and
  handing the VNR and the first VNE solution over to at least one control node in the MEC network when the first VNE solution exists; otherwise,
  rejecting the VNR.

12. The apparatus of claim 11, wherein the method further comprises:
 receiving a resource report;
 updating the resource usage information according to the received resource report;
 calculating a second VNE solution for the VNR according to the processing requirements of the VNR, the updated resource usage information, the attributes of the substrate nodes of the MEC network, and the attributes of the substrate links of the MEC network;
 determining whether the second VNE solution exists; and
 handing over the second VNE solution to the at least one control node if the second VNE solution exists.

13. The apparatus of claim 11, wherein a virtual network requested in the VNR comprises an active on vertex topology.

14. The apparatus of claim 13, wherein the processing requirements of the VNR comprise a priority level, latency requirements, processing requirements of virtual nodes of the virtual network, and processing requirements of virtual links of the virtual network.

15. The apparatus of claim 14, wherein the processing requirements of the virtual nodes comprise the number of instructions.

16. The apparatus of claim 14, wherein the processing requirements of the virtual links comprise bandwidth.

17. The apparatus of claim 11, wherein each of the attributes of the substrate nodes comprises processing capacity and geographic region, and the processing capacity comprises the number of instructions can be done per time unit.

18. The apparatus of claim 11, wherein each of the attributes of the substrate links comprises processing capacity and delay time, and the processing capacity comprises bandwidth.

19. The apparatus of claim 12, wherein the received resource report comprises available capacities of the substrate nodes and available processing capacities of the substrate links.

20. The apparatus of claim 12, wherein the second VNE solution has a shorter processing time for the VNR than the first VNE solution.

* * * * *

UNITED STATES PATENT AND TRADEMARK OFFICE
CERTIFICATE OF CORRECTION

PATENT NO. : 10,986,036 B1
APPLICATION NO. : 16/904860
DATED : April 20, 2021
INVENTOR(S) : Hung-Yu Wei et al.

Page 1 of 1

It is certified that error appears in the above-identified patent and that said Letters Patent is hereby corrected as shown below:

On the Title Page

Item [60], should read:
Provisional application No. 62/929,373, filed on Nov. 1, 2019.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*